March 1, 1927.
H. G. WEYMOUTH
1,619,451
COMBINED FENDER AND LUGGAGE CARRIER
Filed May 29, 1925
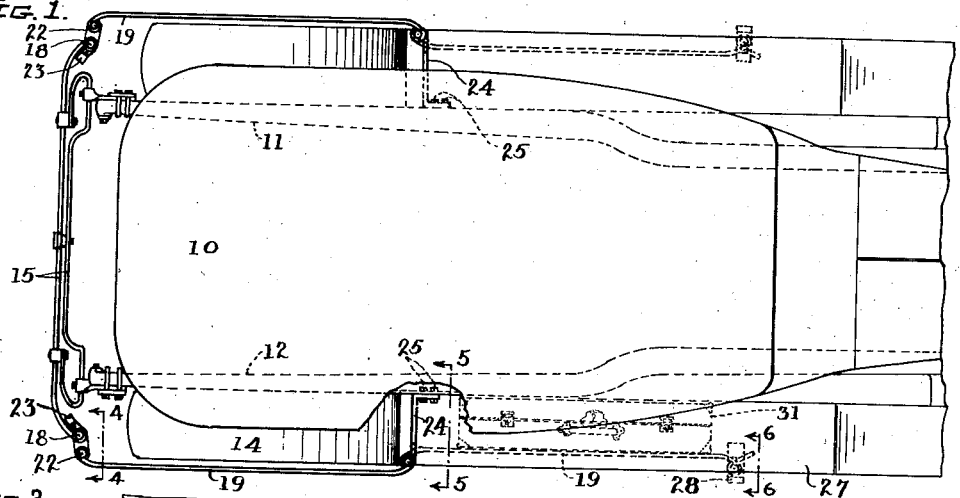
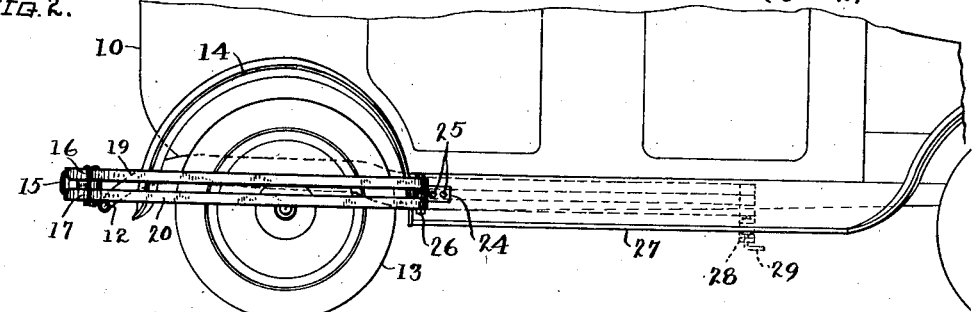
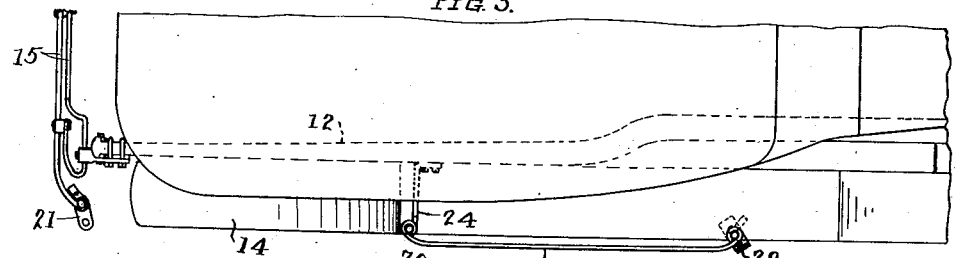
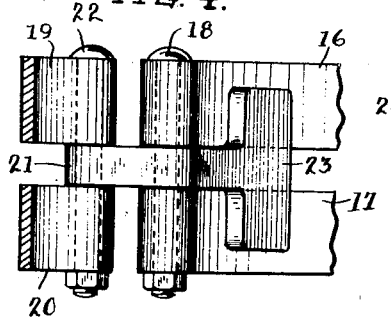
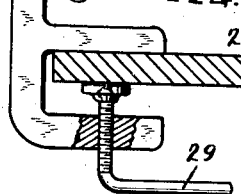
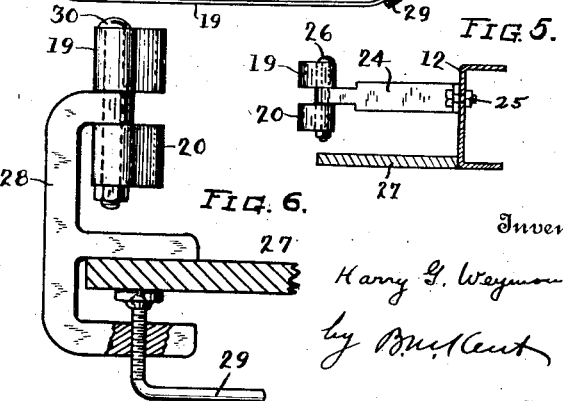
Inventor
Harry G. Weymouth
Attorney Patented Mar. 1, 1927. 1,619,451

UNITED STATES PATENT OFFICE.

HARRY G. WEYMOUTH, OF CLEVELAND, OHIO, ASSIGNOR TO THE EATON AXLE AND SPRING COMPANY, OF CLEVELAND, OHIO, A CORPORATION OF OHIO.

COMBINED FENDER AND LUGGAGE CARRIER.

Application filed May 29, 1925. Serial No. 33,660.

This invention relates primarily to fender guards for automobiles and more particularly to a fender guard that is adapted to be used in cooperation with the running-board to form a luggage-carrier.

It is one of the objects of the invention to provide a guard, of the type referred to, that will be comparatively simple in construction, that will effectively protect the wheel fender and be easily adapted to serve as a luggage-carrier.

A further object of the invention is to provide a guard, of the type referred to, that will be attractive in appearance and capable of being manufactured at a low cost and that may be easily installed on existing automobiles. Other objects of the invention and the features of novelty will be apparent from the following description, taken in connection with the accompanying drawings, of which:

Figure 1 is a plan view of an automobile having my invention applied thereto;

Fig. 2 is a side elevation thereof;

Fig. 3 is a fragment of Fig. 1, illustrating a different arrangement of my invention;

Fig. 4 is an enlarged detail section on the line 4—4 of Fig. 1;

Fig. 5 is an enlarged detail section on the line 5—5 of Fig. 1; and

Fig. 6 is an enlarged detail section on the line 6—6 of Fig. 1.

Referring to the drawings, 10 indicates the body of an automobile and 11 and 12 the side members of the frame thereof. One of the rear wheels is indicated at 13 and the usual fender therefor is indicated at 14.

Arranged at the rear of the automobile, and extending transversely thereof, is a bumper 15, preferably comprising a plurality of vertically spaced bars 16 and 17, having eyes at their ends, those at each end being connected by a bolt 18.

In the form of the invention illustrated in the drawings I have shown my improved fender guard as consisting of the vertically spaced bars 19 and 20 which extend alongside of the fender 14 and have their rear ends pivoted to a member 21, by means of the bolt 22. The member 21 is pivoted to the bolt 18, between the bumper bars 16 and 17, and has a T-shaped extension 23 which engages with the inner faces of the bars 16 and 17 (see Fig. 4) and limits the turning movements of the member 21, on the bolt 18, in one direction.

A supporting bracket 24 is provided for each fender guard, these brackets being preferably secured to the side members 11 and 12, by bolts 25, or in any other suitable manner. The front ends of the bars 19 and 20 are pivotally connected with the brackets 24 by bolts 26.

In Figs. 1 and 2 the bars 19 and 20 are shown in full lines to indicate their position, when serving as a fender guard, and in dotted lines in their position to serve as a luggage-carrier in cooperation with the running-board 27 of the automobile. When it is desired to utilize the bars 19 and 20 as a luggage-carrier, a suitable bracket, for supporting the forward ends of the bars, is provided, and, in Fig. 6, I have illustrated a bracket 28 that is clamped to the running-board 27 by means of the bolt 29 and has an upward extension to which the bars 19 and 20 are connected by means of the bolt 30. The bracket 28 is ordinarily carried in the tool compartment of the automobile and, when it is desired to utilize the bars 19 and 20 for a luggage-carrier, this bracket is clamped to the running-board as shown in Fig. 6, and the rear ends of the bars 19 and 20 are disconnected from the member 21, by removing the bolt 22. The bars are then swung around the pivot bolt 26 to the dotted line position indicated in Figs. 1 and 2 and the bolt 22 may be used as the bolt 30 to connect the bars to the bracket 28.

In Fig. 1 I have illustrated in broken lines, at 31, a piece of baggage which is being carried on the running-board, the bars 19 and 20 serving as the means to hold the baggage on the running-board and, if desired, the baggage may be strapped to the bars 19 and 20 so that it will be more securely held. If it is desired to provide a wider carrying space on the running-board than is afforded by the bars 19 and 20, in the position indicated in dotted lines in Figs. 1 and 2, the bars may be reversed, so as to bow outwardly, as indicated in full lines in Fig. 3.

My invention has the additional advantage that the bars 19 and 20 may be swung out of the way, when it is desired to remove the wheel 13, or the tire thereof, by disconnecting either the front or the rear ends of the bars from their supporting means.

While I have illustrated what I now consider to be the preferred form of my invention, it will be understood that various changes in the details may be made without departing from the spirit of my invention which is defined in the appended claims.

Having thus described my invention, what I claim is:

1. In a device of the class described, the combination with the wheel fender and running-board of an automobile, of a bumper extending transversely of the automobile at one end thereof, a fender guard attached to one end of said bumper and extending longitudinally of the automobile alongside of said wheel fender, a bracket arranged adjacent one end of the wheel fender and pivotally connected with the other end of said fender guard, and a bracket spaced along the running-board from the first mentioned bracket, and said fender guard being adapted to be disconnected from said bumper and then swung about its connection with the first mentioned bracket and connected with the second mentioned bracket.

2. In a device of the class described, the combination with the wheel fender and running-board of an automobile, of a bumper extending transversely of the automobile at one end thereof, a fender guard attached to one end of said bumper and extending longitudinally of the automobile alongside of said wheel fender, a bracket arranged adjacent the wheel fender and above the running-board and pivotally connected with the other end of said fender guard and a bracket spaced along the running-board from the first-mentioned bracket and to which said end of the fender guard that is attached to said bumper is adapted to be connected when the fender guard is swung on its pivotal connection with the first-mentioned bracket to a position above the running-board.

3. In a device of the class described, the combination with the wheel fender and running-board of an automobile, of a fender guard arranged alongside of the wheel fender, means for supporting the ends of said fender guard, a bracket spaced along said running-board from said supporting means and to which one end of the fender guard is adapted to be connected when detached from one of said supporting means, said fender guard, when connected with said bracket cooperating with the running-board to form a luggage-carrier.

4. In a device of the class described, the combination with the wheel fender and running-board of an automobile, of a bumper extending transversely of the automobile at one end thereof, a fender guard comprising a plurality of vertically spaced bars having one end connected to one end of said bumper, and a plurality of brackets spaced along said running-board for supporting said bars in position to cooperate with the running-board to form a luggage-carrier, one of said brackets cooperating with said bumper to support said bars in position alongside said wheel fender.

5. In a device of the class described, the combination with the wheel fender and running-board of an automobile, of supporting means at the opposite ends of said fender and a supporting bracket spaced therefrom along said running-board, and a bar for connection to said supporting means to serve as a guard for said fender and when attached to said bracket and one of said supporting means to cooperate with said running-board to form a luggage-carrier.

6. In a device of the class described, the combination with the wheel fender of an automobile, of a bumper extending transversely of the automobile at one end thereof and comprising a plurality of vertically spaced bars, a bolt connecting the ends of said bars, a member pivoted to said bolt and having projections to engage with said bars to limit turning movement of the member in one direction, a fender guard supported at one end on said member, and means for supporting the other end of said guard.

In testimony whereof I affix my signature.

HARRY G. WEYMOUTH.